United States Patent
Semple et al.

(10) Patent No.: US 7,966,000 B2
(45) Date of Patent: *Jun. 21, 2011

(54) SECURE BOOTSTRAPPING FOR WIRELESS COMMUNICATIONS

(75) Inventors: James F. Semple, London (GB); Gregory Gordon Rose, San Diego, CA (US); John W. Nasielski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/728,746

(22) Filed: Mar. 22, 2010

(65) Prior Publication Data

US 2010/0174907 A1    Jul. 8, 2010

Related U.S. Application Data

(63) Continuation of application No. 11/346,704, filed on Feb. 3, 2006, now Pat. No. 7,715,822.

(51) Int. Cl.
*H04M 1/66* (2006.01)

(52) U.S. Cl. .................. 455/411; 713/169; 713/168
(58) Field of Classification Search .................. None
See application file for complete search history.

(56) References Cited

U.S. PATENT DOCUMENTS

| | | | |
|---|---|---|---|
| 6,438,369 B1 | 8/2002 | Huang et al. | |
| 6,711,400 B1 * | 3/2004 | Aura | 455/411 |
| 2004/0015692 A1 | 1/2004 | Green et al. | |
| 2005/0246548 A1 * | 11/2005 | Laitinen | 713/182 |

FOREIGN PATENT DOCUMENTS

| | | |
|---|---|---|
| EP | 1001570 A2 | 5/2000 |
| EP | 1478204 A2 | 11/2004 |
| GB | 2279540 A | 1/1995 |
| JP | 7193569 | 7/1995 |

(Continued)

OTHER PUBLICATIONS

3GPP TS 33.220 V.1.1.0 XX,XX, "3rd Generation Partnership Project; Technical Specification Group Services and System Aspects; Generic Authentication Architecture (GAA); Generic Bootstrapping Architecture (Release 6)" Feb. 9, 2004, pp. 1-17, figure 4, XP002996023.

3GPP TS 33.220 V1.2.0 3rd Generation Partnership Project; Technical Specification Group Services and System Aspects; Generic Authorization Architecture (GAA); Generic Bootstrapping Architecture (Release 6) (Publication Date: Feb. 29, 2004).

(Continued)

*Primary Examiner* — Phuoc Doan
(74) *Attorney, Agent, or Firm* — Won Tae Kim (57) ABSTRACT

A mutual authentication method is provided for securely agreeing application-security keys with mobile terminals supporting legacy Subscriber Identity Modules (e.g., GSM SIM and CDMA2000 R-UIM, which do not support 3G AKA mechanisms). A challenge-response key exchange is implemented between a bootstrapping server function (BSF) and mobile terminal (MT). The BSF generates an authentication challenge and sends it to the MT under a server-authenticated public key mechanism. The MT receives the challenge and determines whether it originates from the BSF based on a bootstrapping server certificate. The MT formulates a response to the authentication challenge based on keys derived from the authentication challenge and a pre-shared secret key. The BSF receives the authentication response and verifies whether it originates from the MT. Once verified, the BSF and MT independently calculate an application security key that the BSF sends to a requesting network application function to establish secure communications with the MT.

12 Claims, 6 Drawing Sheets

FOREIGN PATENT DOCUMENTS

| | | |
|---|---|---|
| JP | 10510692 | 10/1998 |
| JP | 11505384 | 5/1999 |
| JP | 2002515701 | 5/2002 |
| JP | 2002516521 | 6/2002 |
| JP | 2003005641 | 1/2003 |
| JP | 2007528650 | 10/2007 |
| WO | WO9613920 A1 | 5/1996 |

OTHER PUBLICATIONS

Dierks, et al., "The TLS Procotol", Version 1.0, Network Working Group, Request for Commends 2246, pp. 1-80 (Jan. 1999).

International Search Report and Written Opinion—PCT/US06/003947, International Search Authority—European Patent Office, Jun. 12, 2006.

* cited by examiner

SECURE BOOTSTRAPPING FOR WIRELESS COMMUNICATIONS

CLAIM OR PRIORITY UNDER 35 U.S.C. §119 and §120

The present Application for Patent is a continuation of patent application Ser. No. 11/346,704, entitled "Secure Bootstrapping For Wireless Communications", filed on Feb. 03, 2006, which claims the benefit of U.S. Provisional Application No. 60/650,358 entitled "Secure Bootstrapped Keys in GSM" filed Feb. 4, 2005, and U.S. Provisional Application No. 60/654,133 entitled "Secure Bootstrapping with CAVE" filed Feb. 18, 2005, which are assigned to the assignee hereof and which are hereby expressly incorporated herein by reference.

BACKGROUND

1. Field

The present invention generally relates to systems and methods for securing wireless communications. More specifically, one feature of the invention provides a novel authentication and key agreement scheme for devices supporting legacy network authentication mechanisms, in order to provide application security keys by taking advantage of legacy wireless authentication and key agreement mechanisms.

2. Background

One type of cellular technology for wireless communications is defined by the Global System for Mobile (GSM) protocol, which operates on second generation (2G) wireless telephony networks. GSM is further extended by newer networks, such as General Packet Radio Service (GPRS), also known as 2.5G networks, which offers Internet content and packet-based data services for GSM networks. GSM and GPRS are used for many types of wireless communications including voice, Internet browsing, e-mail and multimedia data. GSM incorporates various security mechanisms to protect the content communicated over such systems. Service providers and users alike rely on these security mechanisms for the privacy of their communications and protection of their data, and service providers use these security measures to authenticate their subscribers for the purposes of billing. These security mechanisms typically operate by authenticating user mobile terminals to the network, and subsequent transmissions may be encrypted. However, GSM security measures are vulnerable to attack by third parties, owing to weaknesses in GSM security protocols, such as false base station attacks arising from a lack of network authentication, the possibility of replay of the security protocols, and weaknesses in GSM encryption algorithms.

These security weaknesses were addressed in the development of security protocols in third generation (3G) wireless communication standards. In particular the Authentication and Key Agreement (AKA) protocol developed for Universal Mobile Telecommunication System (UMTS) includes such features as a sequence number and Message Authentication Code (MAC) which prevent the false base station attacks to which GSM is susceptible. Thus mobile subscribers using a UMTS User Service Identity Module (USIM) for network authentication are not vulnerable to the attacks posed against users of a GSM Subscriber Identity Module (SIM).

3G standardization bodies are also developing a Generic Authentication Architecture (GAA), for example, in the third generation partnership project document 3GPP 33.220 Generic Authentication Architecture (GAA), for a generic bootstrapping architecture. This architecture relies on the 3G AKA protocol to establish keys between a mobile subscriber's User Equipment (UE) and a new server entity known as a Bootstrapping Server Function (BSF). From these keys further keys may be derived and provided by the BSF to various Network Application Functions (NAF), as a way of establishing security keys shared between the NAF and appropriate UE.

The techniques under development rely on the 3G authentication and key agreement methods, such as those supported in a UMTS Universal Subscriber Identity Module (USIM), with its inherent security improvements compared to 2G or earlier legacy systems such as GSM. For instance, Generic Authentication Architecture (GAA) and the Generic Bootstrapping Architecture (GBA) are specified for 3G networks and build on the security infrastructure of 3G mobile networks (i.e., USIM-based security) to provide secure mutual authentication between mobile user equipment and a network server that facilitates network applications and/or services.

However, these mutual authentication techniques (e.g., GAA and GBA) are not available to earlier-developed (e.g., 2G) communication systems, such as GSM Authentication and Key Agreement (AKA) protocols, for instance. These GSM protocols are susceptible to replay attacks, so an attacker may force re-use of keys, and possibly exploit weaknesses in some contexts to reveal the keys and thus undermine the security. Thus, a method is needed for bootstrapping application security keys from GSM authentication and key agreement in such a manner that is not susceptible to replay attacks and keys may not easily be revealed.

Thus, there is a need to establish techniques by which the Generic Authentication Architecture (GAA), specified for 3G networks, may be extended to support legacy systems (e.g., 2G or earlier systems). This would permit subscribers with GSM or other devices, having Subscriber Identity Modules (SIM), to be provisioned with keys for use in mobile network applications and/or services without necessitating replacement of their SIMS by a UMTS USIM. Moreover, such method should not introduce weaknesses to the Generic Authentication Architecture owing to the vulnerabilities of the GSM authentication itself.

SUMMARY

An aspect of the present invention can be regarded as a machine-readable medium comprising: code for generating an authentication challenge at a bootstrapping server function, the authentication challenge including a first random number as a first parameter, a public key based at least in part on the random number, and a signature based at least in part on the random number, the public key and a private key; code for sending the authentication challenge to a mobile terminal, wherein the mobile terminal can verify the origin of the authentication challenge based on a previously obtained bootstrapping server certificate associated with the bootstrapping server function; code for receiving an authentication response at the bootstrapping server function that includes a second random number and a second parameter computed with a copy of the private key generated at the mobile terminal based at least in part on the first random number and a pre-shared secret key stored in a subscriber identification module in the mobile terminal; code for verifying whether the authentication response originated from the mobile terminal by re-computing the first parameter at the bootstrapping server function based on a second key provided to the bootstrapping server function; and code for generating a mutually authenticated key at the bootstrapping server function based at least in part on the first random number, the second random number, and the private key.

Yet another aspect of the present invention can be regarded as a machine-readable medium comprising: code for receiving an authentication challenge at a mobile terminal, the authentication challenge including a first random number as a first parameter, a public key based at least in part on the random number, and a signature based at least in part on the random number, the public key and a private key; code for generating a mutually authenticated key at the mobile terminal based at least in part on the first random number, a second random number, and the private key; code for verifying whether the authentication challenge originates at a bootstrapping server function based on a previously obtained bootstrapping server certificate associated with the bootstrapping server function; and code for sending an authentication response to the bootstrapping server function that includes the second random number and a second parameter computed with a copy of the private key generated at the mobile terminal based at least in part on the first random number and a pre-shared secret key stored in a subscriber identification module in the mobile terminal.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

In the following description, certain terminology is used to describe certain features of one or more embodiments of the invention. For instance, the terms "mobile terminal", "user equipment", "mobile device", "wireless device", and "wireless mobile device" are interchangeably used to refer to mobile phones, pagers, wireless modems, personal digital assistants, personal information managers (PIMs), palmtop computers, laptop computers, and/or other mobile communication/computing devices which communicate, at least partially, through a cellular network. The terms "legacy" is used to refer to networks, protocols, and/or mobile devices which are pre-3G, operate a pre-3G protocol, or employ a GSM-compliant SIM or a CDMA-compliant Authentication Module or MN-AAA Authentication Module. Additionally, the term subscriber identification module is used to refer to a GSM-compliant Subscriber Identity Module (SIM), a CDMA-compliant Authentication Module or MN-AAA Authentication Module, or any other module typically included in a mobile terminal to identify the mobile terminal to a wireless network.

One feature provides a way to extend the Generic Authentication Architecture to support legacy systems, so that subscribers holding a GSM Subscriber Identity Module (SIM) may be provisioned with keys for use in mobile applications without necessitating replacement of the SIM by a 3G, UMTS-compliant User Service Identity Module (USIM).

Figure 1:
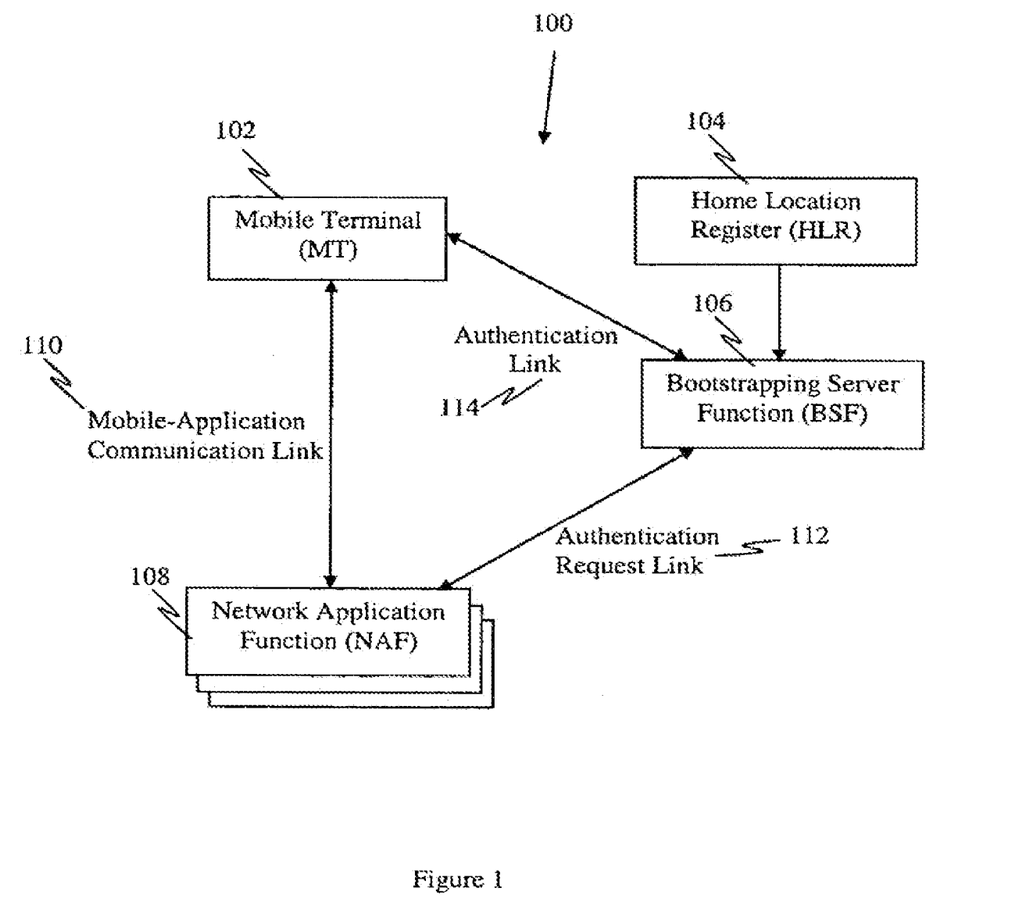
FIG. 1 is a block diagram illustrating a communication system in which a bootstrapping server and a legacy mobile terminal can mutually authenticate each other according to one implementation.

FIG. 1 is a block diagram illustrating a communication system in which a bootstrapping server and a legacy mobile terminal can mutually authenticate each other according to one implementation. A network architecture 100, such as a GSM-compliant or CDMA2000-compliant communication system, includes a mobile terminal (MT) 102, a home location register (HLR) 104, a bootstrapping server function (BSF) 106, and at least one network application function (NAF) 108. HLR 104 and BSF 106 may be hosted in one or more network devices and/or servers that are part of the infrastructure of the network architecture 100. HLR 104 includes a database that contains mobile subscriber information for a wireless carrier, including an International Mobile Subscriber Identity (IMSI) for each MT 102 belonging to the subscriber. The IMSI is a unique number that is associated with an MT 102 in the network. The IMSI is also stored in the Subscriber Identity Module (SIM) of each MT 102 and is sent by the MT to the network HLR to lookup information about the MT 102.

MT 102 may be a legacy wireless communication device that registers or connects with a service provider using a predefined protocol (e.g., a pre-3G protocol) in order to communicate over the network 100. In some implementations, this process of registering with a service provider may involve authenticating MT 102 by using a pre-shared secret key (e.g., stored in a GSM SIM, CDMA Authentication Module, or other legacy module). For instance, MT 102 may contain a GSM-compliant SIM or a CDMA2000-compliant authentication module to enable MT 102 to operate in GSM or CDM2000 networks and allow it to be authenticated by the network for over-the-air communications.

Once the MT 102 is authenticated by the service provider for communications through the network, one aspect of the invention adds another layer of authentication to enable secure network applications. This additional authentication mechanism is independent of the underlying network bearer or authentication mechanism of the bearer. The additional layer of authentication uses existing keys, in the SIM or Authentication Module, together with a novel protocol to establish keys that are independent of the network or bearer security services. This new authentication mechanism provides keys for authentication, or other purposes, shared between MT 102 and a specific NAF 108, distributed to the NAF via BSF 106. The NAF 108 may be an application that operates on a networked device, such as commercial transaction applications and/or location-based services, for instance.

When the MT 102 is ready to start using a network application, it initiates contact with the NAF 108 over a communication link 110. If the MT and NAF do not already share appropriate keys, then the NAF 108 makes a request for authentication keys over an interface 112 to the BFS 106. If it has not already done so, the MT 102 and BSF 106 agree on keys with the MT 102 over an authentication link 114.

A Diffie-Hellman key exchange may be employed as part of the key agreement process between the MT 102 and the BSF 106. The Diffie-Hellman key exchange is a cryptographic protocol which allows two parties that have no prior knowledge of each other to jointly establish a shared secret key over an insecure communications channel. In one application this shared secret key can then be used to encrypt subsequent communications using a symmetric key cipher.

However, without more, conventional Diffie-Hellman key exchange algorithms are susceptible to "man-in the middle" attacks that undermine the security of this algorithm. This is of particular concern where information is exchanged over a wireless medium to perform commercial and/or confidential transactions between an MT 102 and a NAF 108.

One feature of the invention provides a protocol that enables BSF 106 and MT 102 to agree on a public or shared secret key in a manner which is not susceptible to inherent GSM and/or CDMA2000 weaknesses. In particular, the MT 102 is first provisioned with a digital certificate to authenticate the BSF 106. This allows the communications from the BSF 106 to the MT 102 to be digitally signed or carried in a server-authenticated channel, thus allowing the MT 102 to ascertain that the keys or parameters received during the authentication process are coming from the BSF 106 and not from another entity attempting a "man-in-the-middle" or replay attack. Thus, the present method may be applied to extend the authentication scheme of the 3G Generic Bootstrapping Architecture to protocols, other than UMTS AKA, which do not themselves benefit from network authentication.

Figure 2:
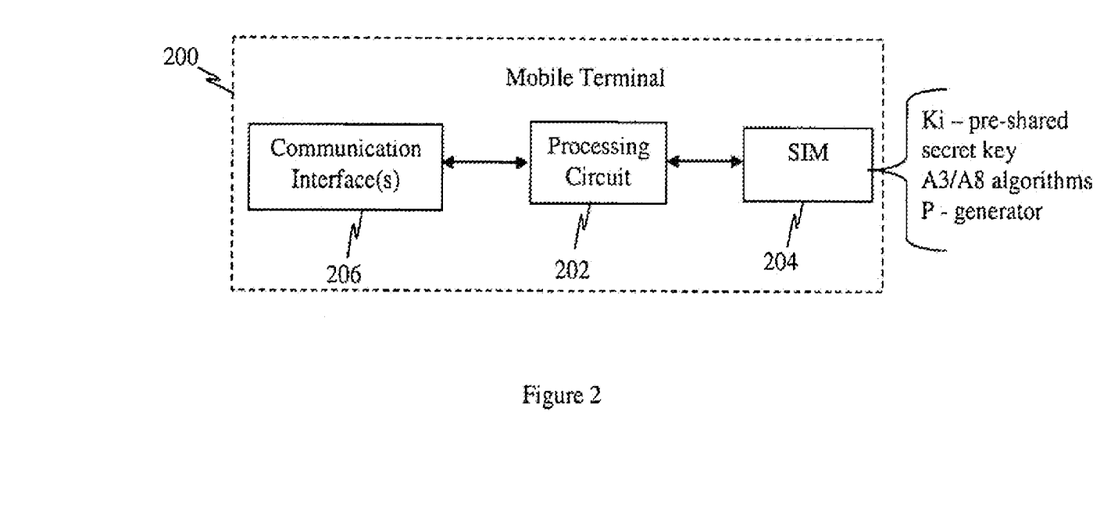
FIG. 2 is a block diagram illustrating a mobile terminal configured to perform mutual authentication with bootstrapping server function operational on a communication network according to one implementation.

FIG. 2 is a block diagram illustrating a mobile terminal (MT) 200 configured to perform mutual authentication with bootstrapping server function operational on a communication network. The MT 200 includes a processing circuit 202 (e.g., processor) coupled to a communication interface 202 to communicate with a wireless network, and a Subscriber Identity Module (SIM) card 204. The processing circuit 202 may be configured to perform part or all of the methods illustrated in FIGS. 4, 5, 6, and 7. The SIM 204 may contain a secret key Ki, an implementation of GSM authentication and key agreement algorithms (i.e., the GSM A3/A8 algorithms), and is inserted in a MT 102 containing a public key or digital server certificate of a public key corresponding to a private key in BSF 106. In particular the SIM 204 may be a standard legacy smart card configured for use in a GSM network. The public key or server certificate may correspond to a RSA public key, or other public-key techniques affording digital signatures may also be used, for example, DSA (digital signature algorithm). The BSF 106 and MT 102 may also share a predetermined generator P of a cyclic group, such as the multiplicative subgroup of a finite field or a point in an elliptic curve, allowing them to employ the Diffie-Hellman key exchange. In alternative embodiments, the MT 200 may include a CDMA2000-compliant authentication module instead of the SIM 204.

Figure 3:
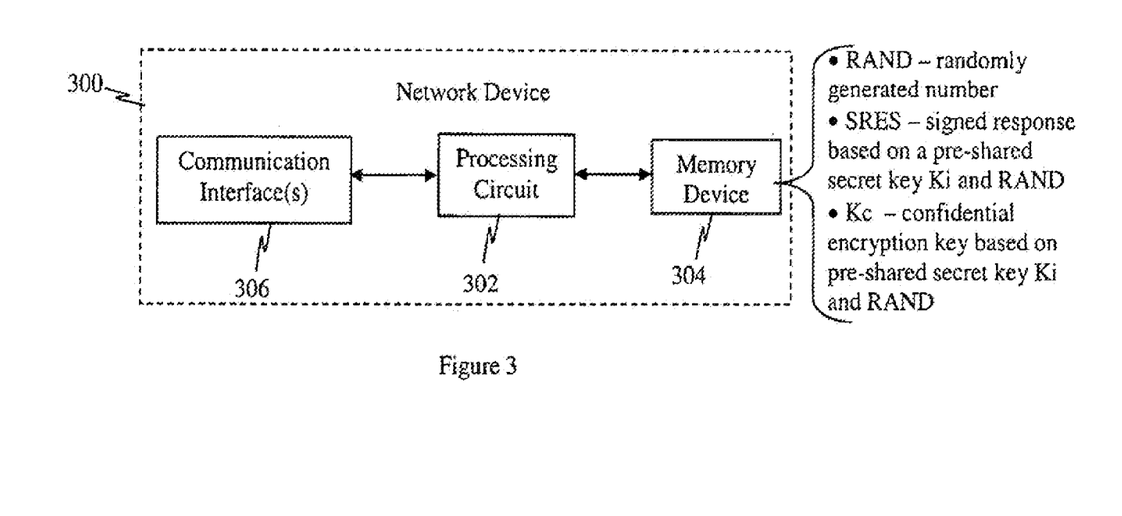
FIG. 3 is a block diagram illustrating a network device configured to perform a bootstrapping server function for authenticating a mobile station according to one implementation.

FIG. 3 is a block diagram illustrating a network device configured to perform a bootstrapping server function (BSF) for authenticating a mobile station (MT) according to one aspect of the invention. The network device 300 includes a processing circuit 302 (e.g., processor) coupled to a communication interface 306 to communicate with the wireless network, and a memory device 304. The processing circuit 302 may be configured to execute the bootstrapping server function while maintaining the keys and/or parameters to implement the Diffie-Hellman key exchange with an MT. For example, the processing circuit 302 may be configured to perform part or all of the methods illustrated in FIGS. 4, 5, 6, and 7.

Figure 4:
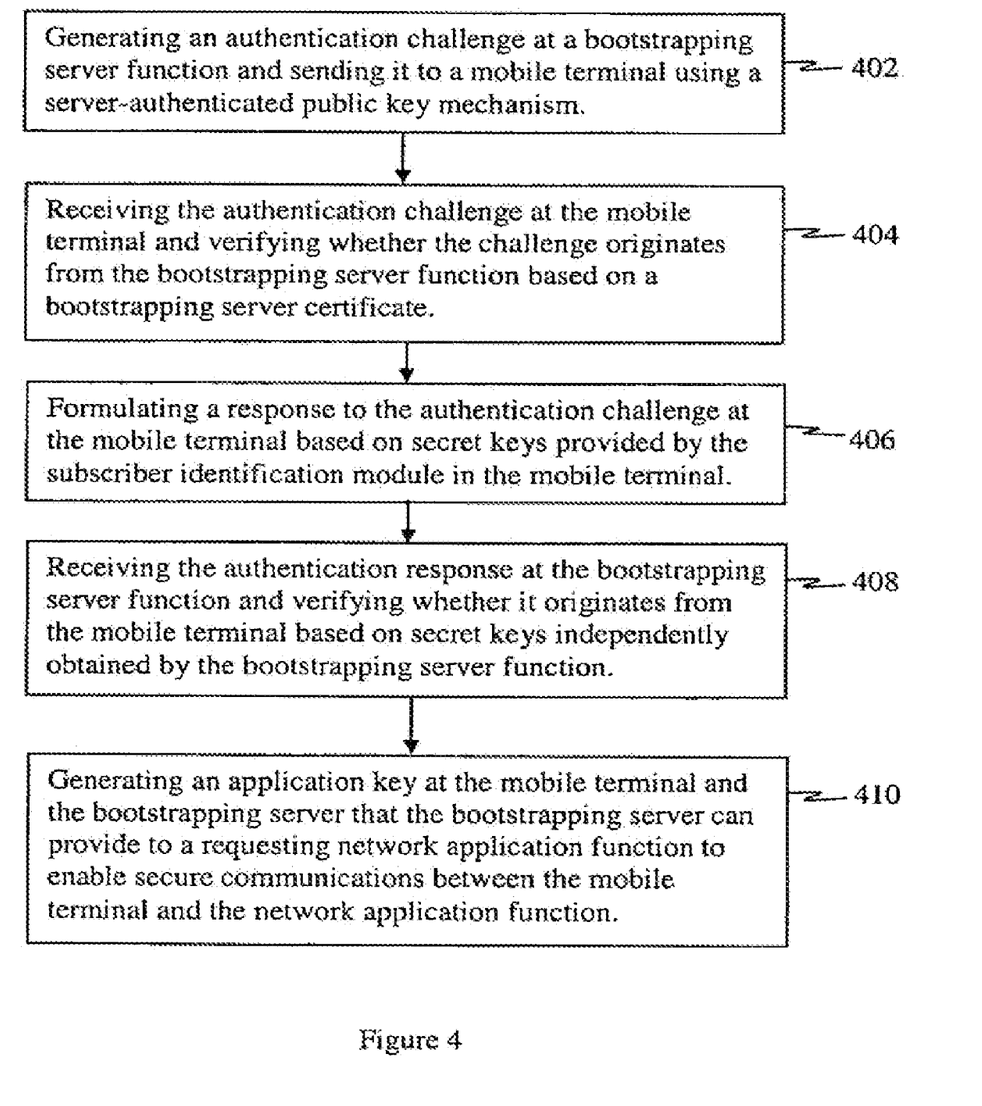
FIG. 4 illustrates a method of performing a challenge-response mechanism that mutually authenticates a legacy mobile terminal and a bootstrapping server function according to one implementation.

FIG. 4 illustrates a method of performing a challenge-response mechanism that mutually authenticates a mobile terminal, having a legacy SIM, and a bootstrapping server function according to one implementation. This challenge-response mechanism makes use of public-key mechanisms to verify the origin of the challenge and pre-shared secret keys to verify the origin of the response.

The bootstrapping server function (BSF) generates an authentication challenge and sends it to the mobile terminal (MT) under a server-authenticated public key mechanism 402. The authentication challenge may include a random number (e.g., RAND) and is derived from a pre-shared secret key (e.g., Ki) known to a network database and a subscriber identification module in the MT. For example, the pre-shared secret key Ki and random number (e.g., RAND) may be used to generate secret keys (e.g., SRES and Kc) that are used to generate the authentication challenge parameters. The authentication challenge may also include additional parameters, such as timestamp, other random numbers, identity information, a Diffie-Hellman public key, etc., and is sent over a digitally signed and/or a server-authenticated channel.

The MT receives the authentication challenge and verifies whether it originates from the BSF based on a bootstrapping server certificate 404. Such bootstrapping server certificate (e.g., a public key) may have been provisioned to the MT and BSF at setup, offline, and/or during a previous process. The MT formulates a response to the authentication challenge based on keys derived and/or provided by the subscriber identification module in the MT 406. These secret keys may be generated by the subscriber identification module based on the random number received in the authentication challenge and a pre-shared secret key stored in the subscriber identification module. For instance, the random number (e.g., RAND) received in the authentication challenge and the pre-shared secret key (e.g., Ki), stored in the subscriber identification module of the MT, may be used to generate keys (e.g., SRES and Kc) that are used to generate the authentication response parameters. Additionally, in some implementations, the MT may also use additional parameters (e.g., timestamp, other random numbers, identity information, a Diffie-Hellman public key) to calculate the keys used to formulate the authentication response.

The BSF receives the authentication response and verifies whether it originates from the MT based on secret keys (e.g., SRES and Kc) independently obtained by the bootstrapping server function 408. For example, the BSF may use the secret keys (e.g., SRES and Kc) generated by the network database based on the random number RAND and the pre-shared secret key (e.g., Ki.). Thus, a bootstrapping server certificate is used by the MT to verify the origin of the challenge while keys (e.g., SRES and Kc) are used by the BSF to verify the origin of the response. This ensures that no attack by a third party is taking place.

From the verification and independent calculations of keys (e.g., SRES and Kc), the MT and BSF a shared key can be computed. An application key may be generated at the mobile terminal and the bootstrapping server which the bootstrapping server can provide to a requesting network application function to enable secure communications between the mobile terminal and the network application function 410. For instance, the shared key, or an application key derived from the shared key, can be sent by the BSF to a requesting network application function (NAF) so that the NAF and MT share a key that can he used to secure communications between the NAF and MT.

Figure 5:
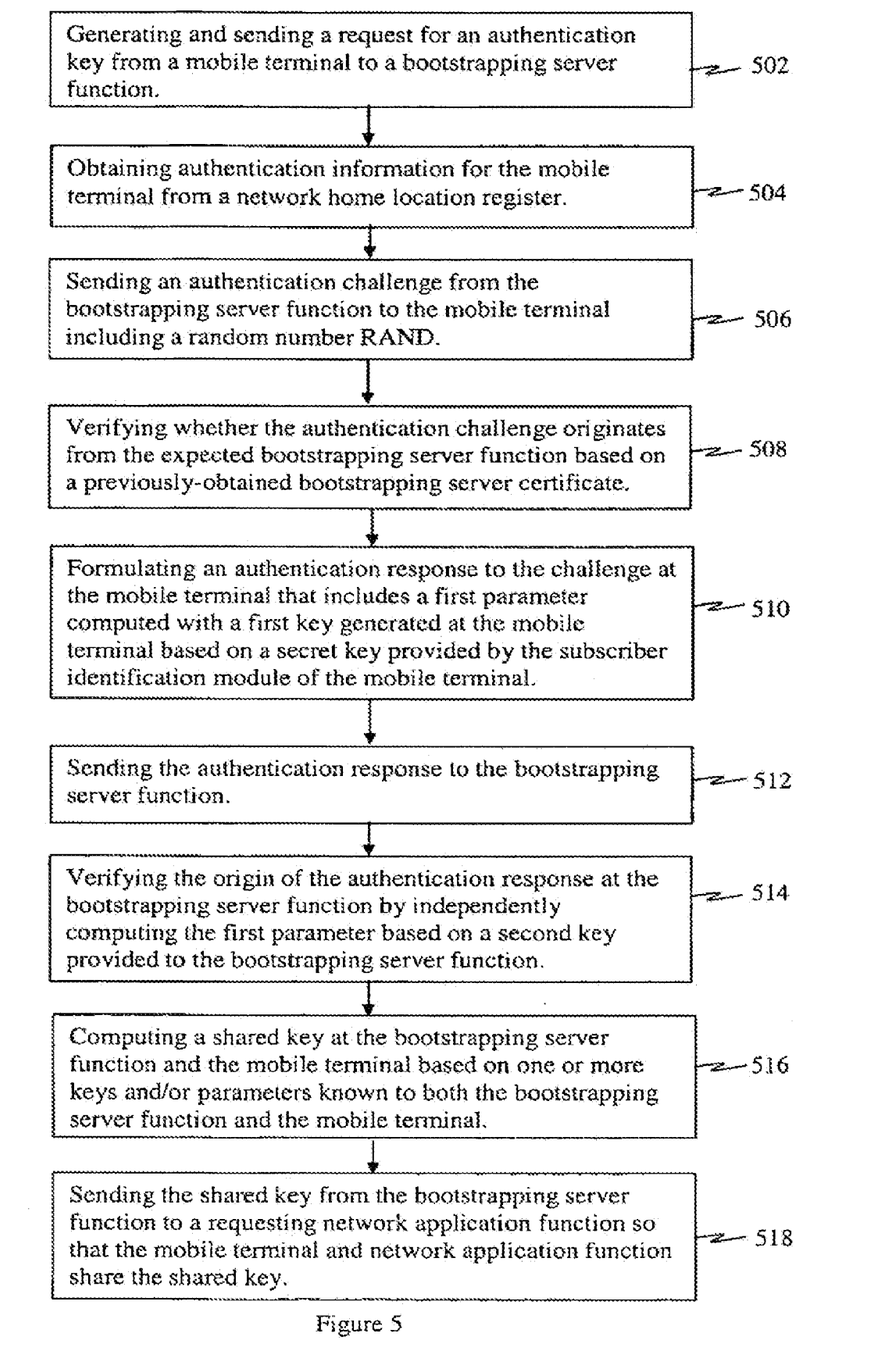
FIG. 5 illustrates a general method of authenticating a mobile terminal using a bootstrapping server function and authentication of the server function according to one implementation.

FIG. 5 illustrates a method of authenticating a mobile terminal using a bootstrapping server function and authentication of the server function according to one embodiment of the invention. This method may be implemented when a network application function wishes to agree on keys with a mobile terminal (MT) prior to initiating a network application transaction. For example, GSM Authentication and Key Agreement (AKA) are based on a challenge-response protocol. A secret key Ki as well as two algorithms A3 and A8 are stored in a Subscriber Identity Module (SIM) inside the MT as well as the network home location register (HLR)/Authentication Center (AuC). The SIM is designed to be tamper-proof and contains secret data and algorithms that cannot be easily read out by a user.

A request for a key is generated and sent from the MT, which has a legacy SIM inside, to a bootstrapping server function (BSF) 502. The BSF obtains authentication information for the MT from a network HLR or AuC 504. For example, the HLR/AuC selects a 128-bit random challenge RAND which is input, together with Ki, into two algorithms A3 and A8 to yield 32-bit output SRES and 64-bit output Kc, respectively. Triplets (RAND, SRES, Kc), corresponding to the SIM of the requesting MT, are then provided to the BSF to authenticate the SIM inside the requesting MT. The BSF then challenges the MT with a random number RAND (generated by the HLR) and other parameters 506.

The MT verifies whether the authentication challenge originates from the expected BSF based on a bootstrapping server certificate 508. For instance, this verification may be performed using a public key or digital server certificate of the BSF which has been provisioned in the MT. If the authentication challenge does not come from the expected BSF, then the process terminates. Otherwise, an authentication response to the challenge is formulated based on a secret key provided by the SIM of the MT 510. For instance, the MT passes the random number RAND to the SIM (in the MT) which calculates one or more secret keys (SRES and Kc) using the pre-shared secret key Ki and random number RAND with the algorithms A3 and A8. The secret keys SRES and Kc are then provided to the MT to formulate the authentication response. In one implementation, the secret keys SRS and Kc may be used to compute a message authentication code, or derive or encrypt one or more parameters, that is sent as part of the authentication response.

The authentication response is sent from the MT to the BSF 512. The BSF then verifies the origin of the authentication response based on an independently obtained secret key 514. For instance, the SRES and Kc obtained from the HLR (in the triplet corresponding to random number RAND and pre-shared secrete key Ki) may be used to validate one or more parameters in the authentication response from the MT. For instance, the BSF may independently calculate the message authentication code (or other parameter in the authentication response) using the random number RAND, SRES, and/or Kc received from the HLR. If the parameters (e.g., message authentication code) calculated by the MT and BSF match, then the origin of the authentication response is verified.

In an alternative implementation, the MT may calculate a third key using the one or more secret keys (SRES and Kc obtained from the SIM) and other parameters (obtained from the authentication challenge or response or from the SIM). This third key is then used to formulate the authentication response (e.g., compute the message authentication code). The BSF may also calculate the same key since it knows the same keys and/or parameters as the MT. Thus, the BSF can verify whether the authentication response originated from the MT.

Once the authentication response is verified, the BSF and MT independently compute a shared key based on one or more keys and/or parameters (e.g., SRES, Kc, and/or other parameters) known to both the BSF and MT 516. This shared key can then be provided to a requesting NAF to establish secure communications or transactions between the MT and NAF 518.

The MT authenticates transmissions from the BSF by means of a public key mechanism. The BSF challenges the MT with a random number RAND and establishes that it is in possession of the corresponding secret keys SRES and/or Kc in order to authenticate the transmissions from the MT. Thus, the BSF and MT are mutually authenticated in order to share information from which keys may be derived for the purpose of bootstrapping.

Figure 6:
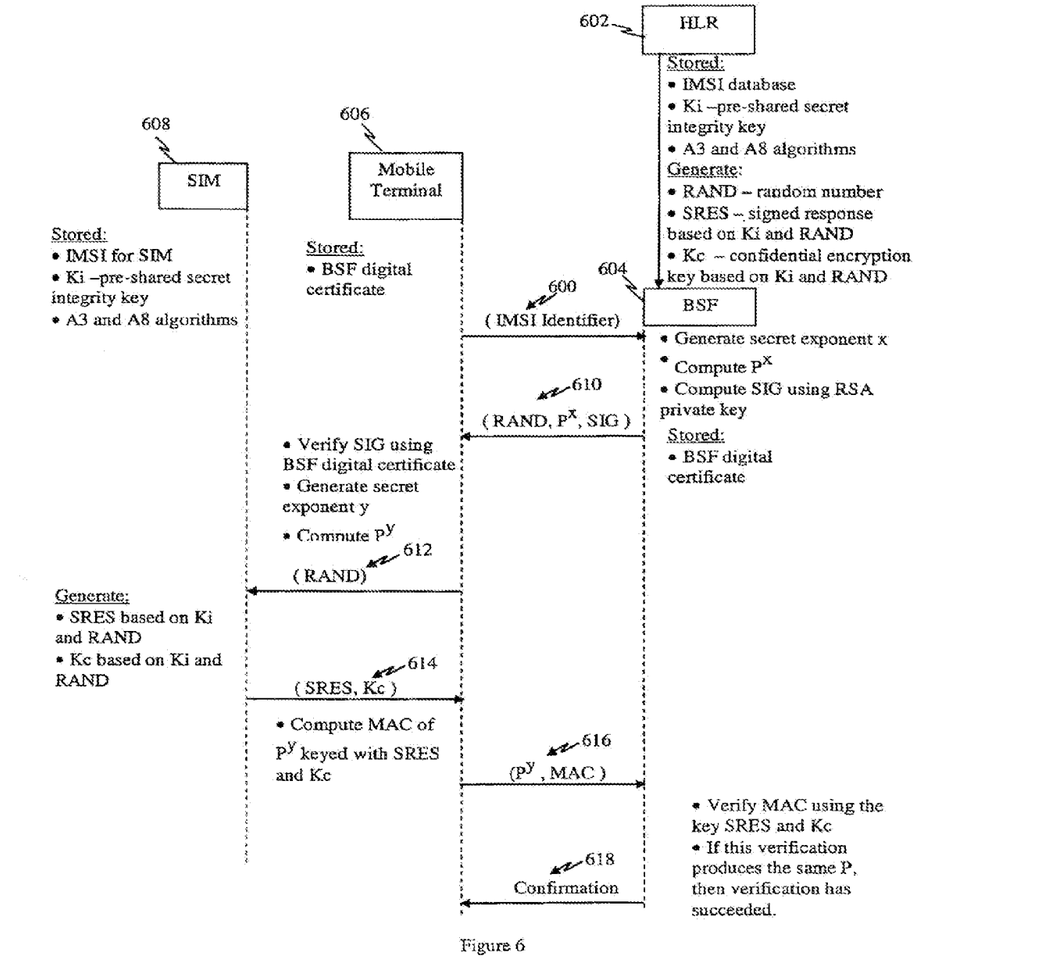
FIG. 6 illustrates a method of performing a challenge-response protocol between a GSM-compliant mobile terminal and a bootstrapping server function to securely authenticate each other for network application functions according to one implementation.

FIG. 6 illustrates a method of performing a challenge-response protocol between a GSM-compliant mobile terminal 608 and a bootstrapping server function 604 to securely authenticate each other for network application functions according to one implementation. GSM Authentication and Key Agreement (AKA) are based on a challenge-response protocol. In order to bootstrap based on a legacy SIM, the HLR/AuC and SIM perform similar calculations based on the existing secret key Ki and GSM algorithms A3 and A8. In the GSM protocol, the secret key Ki and the authentication algorithm(s) A3 and A8 are stored in a subscriber identity module (SIM) smart card as well as by the network HLR 602. The SIM 608 is designed to be tamper-proof and contains data and algorithms that cannot be easily read out by a user. Typically, the secret key Ki and authentication algorithm(s) A3 and A8 are used to establish over-the-air service with the network.

In one embodiment, a request for authentication keys may be initiated by MT 606 retrieving its associated International Mobile Subscriber Identity (IMSI) 600 from its SIM 608 and sending it to a bootstrapping server function (BSF) 604. The BSF 604 sends the IMSI 600 to the HLR 602 where it may verify whether the IMSI 600 belongs to a MT that subscribes to the network. The HLR 602 may be operated by the service provider for the subscriber whose SIM is contained in MT 606. The HLR 602 selects, for example, a 128-bit random challenge RAND and together with pre-shared secret key Ki, uses them as inputs for two algorithms A3 and A8 to yield 32-bit output signed response SRES and 64-bit output secret confidentiality key Kc, respectively. The HLR 602 then provides the triplets (RAND, SRES, Kc) to the BSF 604, corresponding to the identity IMSI 600 of SIM 608. The BSF 604 generates a random secret exponent x and computes a Diffie-Hellman public key $P^x$, where P is a generator of a cyclic group previously provisioned to both the BSF 604 and MT 606, such as the multiplicative group of a finite field or the additive group of an elliptic curve. The BSF 602 then sends a triplet (RAND, $P^x$, SIG) 610 to the MT 606, where SIG is a digital signature computed using the BSF 604 RSA private key. The message 610 may be further enhanced to include other server-authenticated parameters such as a transaction identifier.

The MT 606 receives the triplet (RAND, $P^x$, SIG) 610 and uses the BSF 604 digital certificate to verify the SIG. The MT 606 is assumed to be provisioned with the digital certificate to enable it to authenticate data transmitted from the BSF 604. If the data is deemed to have originated at the BSF, the MT 606 generates a random number y and computes $P^y$. The MT 606 also passes RAND 612 to the SIM 608 which returns a pair (SRES, Kc) 614, generated based on RAND and Ki, to the MT 606. If the SIM 608 is authentic, then it should generate the same SRES and Kc as was generated by HLR 602. The MT 606 then computes a message authentication code MAC of $P^y$, keyed with SRES and Kc, and sends a response ($P^y$, MAC) 616 to the BSF 604. This response 616 may be further enhanced to include other parameters over which the MAC is computed, such as a transaction identifier.

The BSF 604 receives $P^y$ and verifies the MAC using the SRES and Kc which it received in the authentication triplet from the HLR 602. If this MAC is correct, this verifies that the MT 606 is in possession of the correct SIM 608, and a confirmation message 618 may be sent to the MT 606.

In this embodiment the MT 606 and BSF 604 have thus carried out a mutually authenticated Diffie-Hellman key exchange and agree on a key $P^{xy}$ which they compute respectively. A key for further communications may then be computed, for instance, as a hash of $P^{xy}$, possibly including further information known to both the MT and BSF such as identity information, RAND, SRES and Kc. In the case where the Diffie-Hellman calculations take place, or the resulting key is stored, in the MT 606 rather than the SIM 608, this key $P^{xy}$ and the resulting agreed key should be deleted if the SIM 608 is removed from the MT, or the MT is powered on using a different SIM 608.

Note that this protocol protects against standard weaknesses arising from GSM provided that the MT 606 does not support algorithm A5/2. The A5/2 algorithm allows a near-instantaneous break in GSM protocol which may undermine the protocol above. However, the A5/2 algorithm is being phased out in 3GPP Release 6 specifications.

Note further that a man-in-the-middle attempting to attack the protocol cannot change the initial challenge (RAND, $P^x$, SIG), because of the SIG, so an attacker cannot insert its own $P^z$ or use a different RAND. It could at best replay these messages, but it cannot impersonate the BSF as any replay is tantamount to using ephemeral Diffie Hellman. Conversely, if the BSF ensures that the RAND used is fresh, from one use of this protocol to the next, and ensures that the response ($P^y$, MAC) is received in a short period of time, then an attacker does not have a chance to derive the SRES and Kc through other means such as challenging with RAND in the typical GSM scenario and attacking the A5/1 algorithm to derive the keys.

Figure 7:
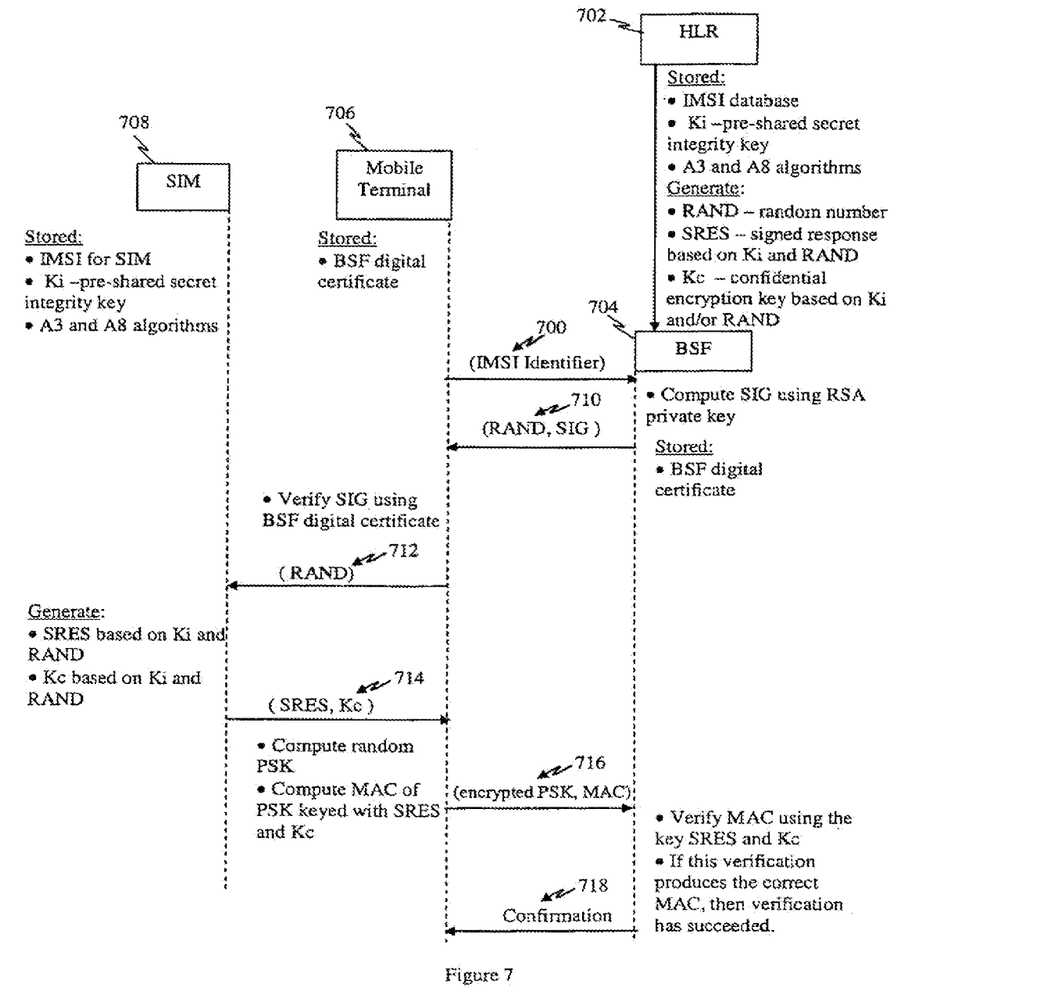
FIG. 7 illustrates an alternative method of performing a challenge-response protocol between a GSM-compliant mobile terminal and a bootstrapping server function to securely authenticate each other for network application functions according to one implementation.

FIG. 7 illustrates an alternative method of performing a challenge-response protocol between a legacy mobile terminal (MT) 706 supporting a GSM-compliant Subscriber Identity Module 708 (SIM) and a bootstrapping server function (BSF) 704 to securely authenticate each other and agree on a key for network application functions (NAF) according to one implementation. Similar to the method in FIG. 6, a request for authentication keys may be initiated by MT 706 sending its associated IMSI 700 from its SIM 708 to the BSF 704. The BSF 704 sends the IMSI 700 to the HLR 702 where it can verify whether the IMSI 700 belongs to a MT that subscribes to the network. The HLR 702 then selects and provides the triplets (RAND, SRES, Kc) to the BSF 704, corresponding to the identity IMSI 700 of SIM 708. For example, RAND may be a 128-bit random number and Ki is a pre-shared secret integrity key Ki, and they are used as inputs for two algorithms A3 and A8 that yield a signed response SRES (e.g., 32-bit number) and secret confidentiality key Kc (e.g., 64-bit number), respectively. The MT 706 is assumed to be provisioned with a public key or digital certificate enabling it to authenticate data transmitted from the BSF 704.

The BSF 704 receives the triplet (RAND, SRES, Kc) from the HLR 702. The BSF 704 then computes a digital signature SIG of the RAND (and possibly, other parameters, such as a time stamp, sequence number, random seed or identity information) using a public key based mechanism which enables the MT 706 to authenticate the source of data received from the BSF 704. The BSF 704 sends RAND and SIG 710 to the MT 706. Upon receipt of the (RAND, SIG) 710, the MT 706 verifies the SIG using the digital certificate of the BSF 704. If the data is deemed to be from the BSF 704, the MT 706 sends RAND 712 to the SIM 708 to retrieve the corresponding parameters SRES and Kc. That is, the SIM 708 generates an SRES and Kc pair by using the pre-shared secret key Ki and RAND as inputs to the A3 and A8 algorithms with which it has been provisioned. The MT 706 may then generate a key PSK, encrypting PSK under a public key-based mechanism, and apply a message authentication code MAC to the result.

Further parameters such as a time stamp, sequence number, random seed or identity information may be included in the response. The MAC may be based on a function or algorithm (known to both the MT 706 and BSF 704) which may include Kc and SRES as input parameters, and is used to prove to the BSF 704 that the MT 706 possesses the correct SIM 708. Note that the operations of public-key based encryption of the data and the MAC keyed with SRES and Kc may be performed in either order. The MT 706 then sends (encrypted PSK, MAC) 716 to the BSF 704, which verifies that the MT 706 is in possession of the correct SRES and Kc by verifying the MAC. This verification of the MAC is made by using the SRES and Kc received by the BSF 704 from the HLR 702 to recalculate a MAC and compare it to the MAC received from the MT 706. If the MAC is deemed correct, the PSK is deemed to have originated from the MT 706 and SIM 708, and a confirmation or acknowledgement 718 is sent to the MT 706. Thus, this PSK is agreed between MT 706 and BSF 704, or further key derivations may be made using PSK, Kc, SRES, identity information and possibly other parameters.

The challenge-response mechanism illustrated in FIGS. 6 and 7 for GSM-based mobile terminals may also be implemented on other types of mobile terminals. For instance, the invention may be operational on a CDMA2000-compliant network and mobile terminal (MT). In such implementation, a CDMA2000-compliant mobile terminal contains a cdma2000 Authentication Module, UIM or RUIM to agree on a pre-shared secret key which can be used for security of network applications. In one implementation, the pre-shared key may be generated using an authenticated Diffie Hellman algorithm, where the public parameter $P^x$, provided by the BSF, is authenticated by means of a public-key digital signature mechanism (i.e., a bootstrapping server certificate known to the MT), whereas the parameter $P^y$, provided by the MT, is authenticated by adding a Message Authentication Code keyed with such material as the SMEKEY (signaling message encryption key) from CAVE (Cellular Authentication and Voice Encryption Algorithm) or the MN-AAA Authenticator (Mobile Node Authentication, Authorization, and Accounting). It is assumed that the MT is provisioned with a public key or digital certificate which enables it to authenticate digitally signed messages from the BSF and a pre-shared secret key Ki and Authentication Code identifier IMSI is known to both the Authentication Code Module and the HLR.

Those skilled in the art will appreciate that this approach applies equally in the circumstance that bearer authentication is based on CAVE, and again offers the advantage that these bootstrapping operations may be carried out using symmetric and RSA operations throughout and may thus offer implementation advantages over protocols requiring support of both Diffie Hellman and RSA.

One or more of the components and functions illustrated in FIGS. 1, 2 and/or 3 may be rearranged and/or combined into a single component or embodied in several components without departing from the invention. Additional elements or components may also be added without departing from the invention. The apparatus, devices, and/or components illustrated in FIGS. 1, 2, and/or 3 may be configured to perform the methods, features, or steps illustrated in FIGS. 4, 5, 6, and/or 7.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A machine-readable medium comprising:
    code for generating an authentication challenge at a bootstrapping server function, the authentication challenge including a first random number as a first parameter, a public key based at least in part on the random number, and a signature based at least in part on the random number, the public key and a private key;
    code for sending the authentication challenge to a mobile terminal, wherein the mobile terminal can verify the origin of the authentication challenge based on a previously obtained bootstrapping server certificate associated with the bootstrapping server function;
    code for receiving an authentication response at the bootstrapping server function that includes a second random number and a second parameter computed with a copy of the private key generated at the mobile terminal based at least in part on the first random number and a pre-shared secret key stored in a subscriber identification module in the mobile terminal;
    code for verifying whether the authentication response originated from the mobile terminal by re-computing the first parameter at the bootstrapping server function based on a second key provided to the bootstrapping server function; and
    code for generating a mutually authenticated key at the bootstrapping server function based at least in part on the first random number, the second random number, and the private key.

2. The machine-readable medium of claim 1, wherein the subscriber identification module is one of either a Global System for Mobile (GSM) Subscriber Identity Module (SIM) or a CDMA2000 Authentication Module.

3. The machine-readable medium of claim 1 further comprising:
    code for comparing the parameter received in the authentication response to the parameter re-computed by the bootstrapping server function, wherein the authentication response is deemed to have originated from the mobile terminal if both parameters are the same.

4. The machine-readable medium of claim 1 further comprising:
    code for obtaining the private key from a home location register communicatively coupled to the bootstrapping server function.

5. The machine-readable medium of claim 1, wherein the private key and the copy of the private key are generated based on the same secure algorithms and a pre-shared secret key known to a subscriber identification module in the mobile terminal and a network database communicatively coupled to the bootstrapping server function.

6. The machine-readable medium of claim 1, wherein the copy of the private key provided to the bootstrapping server function is generated based on a copy of the pre-shared secret key stored outside the mobile terminal and the random number in the authentication challenge.

7. The machine-readable medium of claim 1 wherein the first parameter of the authentication response includes a message authentication code that is used by the bootstrapping server function to verify the origin of the authentication response.

8. The machine-readable medium of claim 1 further comprising:
    code for sending the mutually authenticated key from the bootstrapping server function to a requesting network application function so that the mobile terminal and the network application function share a key for securing communications between them.

9. A machine-readable medium comprising:
code for receiving an authentication challenge at a mobile terminal, the authentication challenge including a first random number as a first parameter, a public key based at least in part on the random number, and a signature based at least in part on the random number, the public key and a private key;
code for generating a mutually authenticated key at the mobile terminal based at least in part on the first random number, a second random number, and the private key-
code for verifying whether the authentication challenge originates at a bootstrapping server function based on a previously obtained bootstrapping server certificate associated with the bootstrapping server function; and
code for sending an authentication response to the bootstrapping server function that includes the second random number and a second parameter computed with a copy of the private key generated at the mobile terminal based at least in part on the first random number and a pre-shared secret key stored in a subscriber identification module in the mobile terminal.

10. The machine-readable medium of claim 9 further comprising:
code for providing the private key from the subscriber identification module to the mobile terminal in response to receiving the random number received in the authentication challenge.

11. The machine-readable medium of claim 10, wherein the first key is generated using additional parameters transmitted in the authentication challenge and response.

12. The machine-readable medium of claim 9, wherein the subscriber identification module is one of either a Global System for Mobile (GSM) Subscriber Identity Module (SIM) or a CDMA2000 Authentication Module.

* * * * *